United States Patent
Kirtley et al.

(10) Patent No.: US 8,742,720 B2
(45) Date of Patent: Jun. 3, 2014

(54) CHARGING STATION

(75) Inventors: Gary Kirtley, Vicksburg, MI (US); Craig Randall, Lagrange, IN (US)

(73) Assignee: Owens Products, Inc., Sturgis, MI (US)

( * ) Notice: Subject to any disclaimer, the term of this patent is extended or adjusted under 35 U.S.C. 154(b) by 352 days.

(21) Appl. No.: 13/188,501

(22) Filed: Jul. 22, 2011

(65) Prior Publication Data

US 2013/0020996 A1  Jan. 24, 2013

(51) Int. Cl.
*H02J 7/00* (2006.01)
*H01R 13/46* (2006.01)
*H01R 13/62* (2006.01)
*H01M 2/04* (2006.01)
*H01M 2/10* (2006.01)

(52) U.S. Cl.
CPC ............ *H02J 7/0042* (2013.01); *H02J 7/0044* (2013.01); *H01R 13/62* (2013.01); *H01M 2/04* (2013.01); *H01M 2/10* (2013.01); *H01M 2/1016* (2013.01)
USPC .............. 320/113; 320/107; 320/115; 174/54

(58) Field of Classification Search
CPC ..... H02J 7/0042; H02J 7/0044; H02J 7/0045; H01R 13/62; H01M 2/04; H01M 2/10; H01M 2/1016
USPC .............................. 320/113, 107, 115; 174/54
See application file for complete search history.

(56) References Cited

U.S. PATENT DOCUMENTS

| | | | |
|---|---|---|---|
| 5,978,569 A | | 11/1999 | Traeger |
| 6,844,494 B1 * | | 1/2005 | Nevins ............................. 174/53 |
| 7,548,711 B2 * | | 6/2009 | Ziegelmuller et al. ........ 399/123 |
| 7,652,452 B2 | | 1/2010 | Mori et al. |
| 2003/0141840 A1 * | | 7/2003 | Sanders ........................ 320/107 |
| 2007/0254724 A1 | | 11/2007 | Daniels |
| 2009/0278495 A1 | | 11/2009 | Kaye et al. |
| 2010/0171465 A1 | | 7/2010 | Seal et al. |
| 2010/0211643 A1 * | | 8/2010 | Lowenthal et al. ........... 709/206 |
| 2010/0225475 A1 * | | 9/2010 | Karch et al. ................... 340/540 |

(Continued)

FOREIGN PATENT DOCUMENTS

| | | |
|---|---|---|
| GB | 2410845 | 8/2005 |
| GB | 2428525 | 1/2007 |
| GB | 2438002 | 11/2007 |
| JP | 2003142163 A * | 5/2003 |

OTHER PUBLICATIONS

EP0 773519 A2 Inoue Katsuhiro, Numa Katsuya, Vending Machine forcharging a secondary battery of a mobile phone,May 14, 1997, European Patent Application, Entire Document.*
Travel Cord Organizer by Kangaroom Storage, from Amazon.com.

(Continued)

*Primary Examiner* — M'Baye Diao

(57) ABSTRACT

A lockable charging station for charging rechargeable electric devices comprising a base to encapsulate the electrical charging station and a plurality of locking cover members, wherein each locking cover member is removably mechanically engageable with the base via tab and slot engagement and is individually lockable to the base using a lock. Each locking cover member secures an individual electric device to the base so that the electric device is held in electrical engagement with the charging station until the individual user removes the locking cover. The lockable charging station may include a multi-unit charger with an encapsulating base and plurality of locking cover members or a base with mounting points for individual chargers and a plurality of locking covers.

18 Claims, 4 Drawing Sheets

(56) References Cited

U.S. PATENT DOCUMENTS

2011/0254661 A1* 10/2011 Fawcett et al. ............... 340/5.61
2011/0306223 A1* 12/2011 Bauer ........................... 439/136
2012/0135634 A1* 5/2012 Gaul et al. .................... 439/488
2012/0139484 A1* 6/2012 Gunderman et al. ......... 320/108

OTHER PUBLICATIONS

"Connecting Students with their studies . . . with handheld computers," by TriBeam.

* cited by examiner

CHARGING STATION

CROSS-REFERENCE TO RELATED APPLICATIONS

Not Applicable.

BACKGROUND OF THE INVENTION

The invention is in the field of charging stations for electronic devices having rechargeable batteries, and, more specifically in the field of a charging station having a lockable cover.

In order to fully charge rechargeable electronic devices, they must remain electrically connected to a power source for a sufficient amount of time. The invention described herein permits an electrical device to be secured in location at the charging station, so that it can be maintained in electrical connection with the power source for the time necessary to be recharged.

BRIEF SUMMARY OF THE INVENTION

The invention comprises a lockable charging station for charging rechargeable electric devices comprising a base and a plurality of locking cover members; wherein each locking cover member is removably mechanically engageable with the base and is individually lockable to the base using a lock, and wherein each locking cover member is of a suitable size and shape and is mechanically engageable with the base in such a manner so as to secure one electric device to the charging station when the electric device is electrically engaged with the charging station.

The invention is preferably customized or customizable so as to fit a specific charging station for a specific type of rechargeable electric device, and may be used with a multi-unit charging station or individual charging units.

DETAILED DESCRIPTION OF THE PREFERRED EMBODIMENTS

Figure 1:
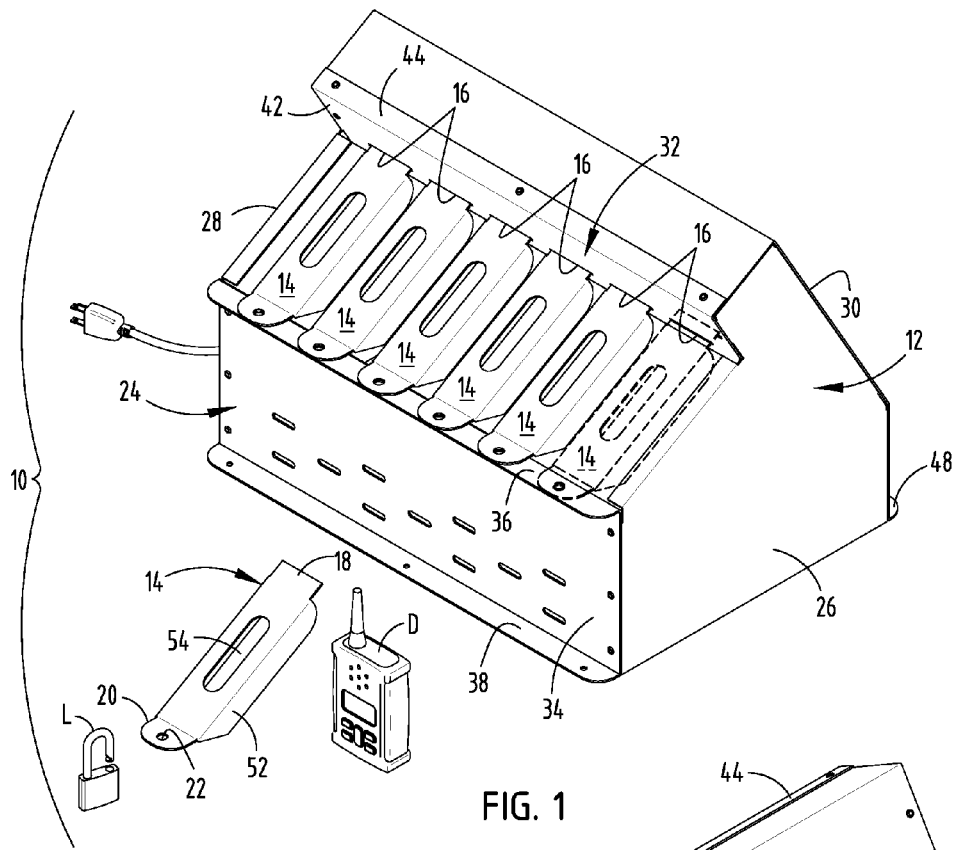
FIG. 1 is a front perspective view of a first charging station cover assembly.

In a first preferred embodiment, a lockable cover assembly 10 for a multi-unit charging device C comprises a base 12 and a plurality of locking covers 14, with one locking cover 14 for each rechargeable electric device D accommodated by charging device C. (FIGS. 1-4) Base 12 has a slot 16 to accommodate a tab 18 on each locking cover 14, and each locking cover 14 has an end 20 with a hole 22 therein to accommodate the use of a lock L to secure locking cover 14 to base 12. (FIG. 1) This embodiment of the lockable cover assembly 10 may be used with devices D such as two-way radios, where a single charging station C is used to charge several electronic devices D at one time.

Figure 2:
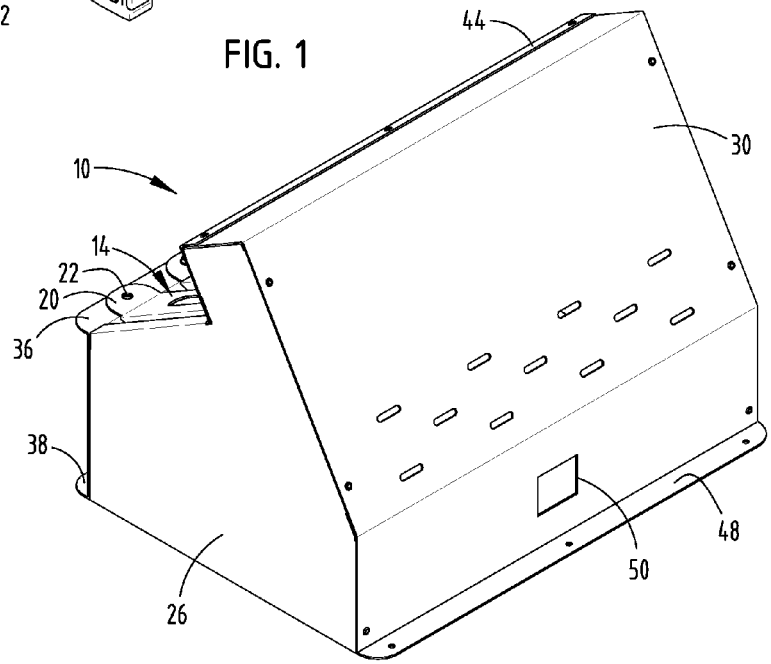
FIG. 2 is a rear perspective view of the first charging station cover assembly shown in FIG. 1.
Figure 3:
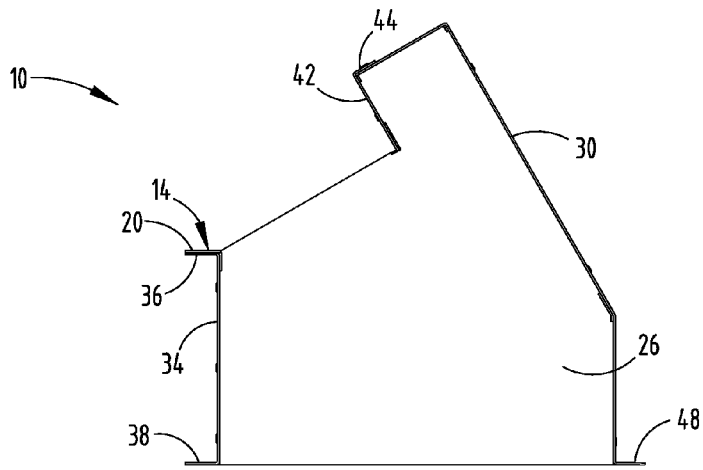
FIG. 3 is a side view of the first charging station cover assembly shown in FIG. 1.

In the first embodiment of the lockable cover assembly 10, as shown in FIGS. 1 and 2, base 12 comprises a lower front channel 24, two ends 26, 28, a rear 30, and an upper front channel 32.

Lower front channel 24 and upper front channel 32 provide corresponding features for attaching locking covers 14 to base 12. (FIG. 4) Lower front channel 24 comprises a main body 34 with a locking flange 36 and a base flange 38 extending therefrom. Locking flange 36 has holes 40 therein to correspond to holes 22 in locking covers 14. Front top channel 32 comprises a main body 42 and two flanges 44, 46 extending therefrom. Main body 42 has slots 16 therein to accommodate each locking cover 14, and flange 44 is used to secure front top channel 32 to rear 30.

Rear 30, like lower front channel 24, has a base flange 48 extending outward from the bottom thereof. Base flanges 38, 48 may be used to secure base 12 to a support surface. Rear 30 also includes an opening 50 for passage of an electrical cord used to supply power to charging station C.

Locking covers 14 comprise individual covers, with one to be used for each rechargeable electric device D. Locking cover 14 includes tab 18 which slides into slot 16, and on opposing end 20, a hole 22 which aligns with hole 40 on locking flange 36 when locking cover 14 is installed on base 12. End 20, depending on the alignment of lower and upper front channels 24, 32, may be arranged to form an angle with the main body of locking cover 14, so that it lies flat along the top of locking flange 36. Locking cover 14 further comprises side flanges 52 which further secure the body of rechargeable electric device D when locking cover 14 is installed on base 12, and locking cover 14 may also include a cutout 54 to allow passage of an antenna or other feature of rechargeable electric devices D.

Figure 4:
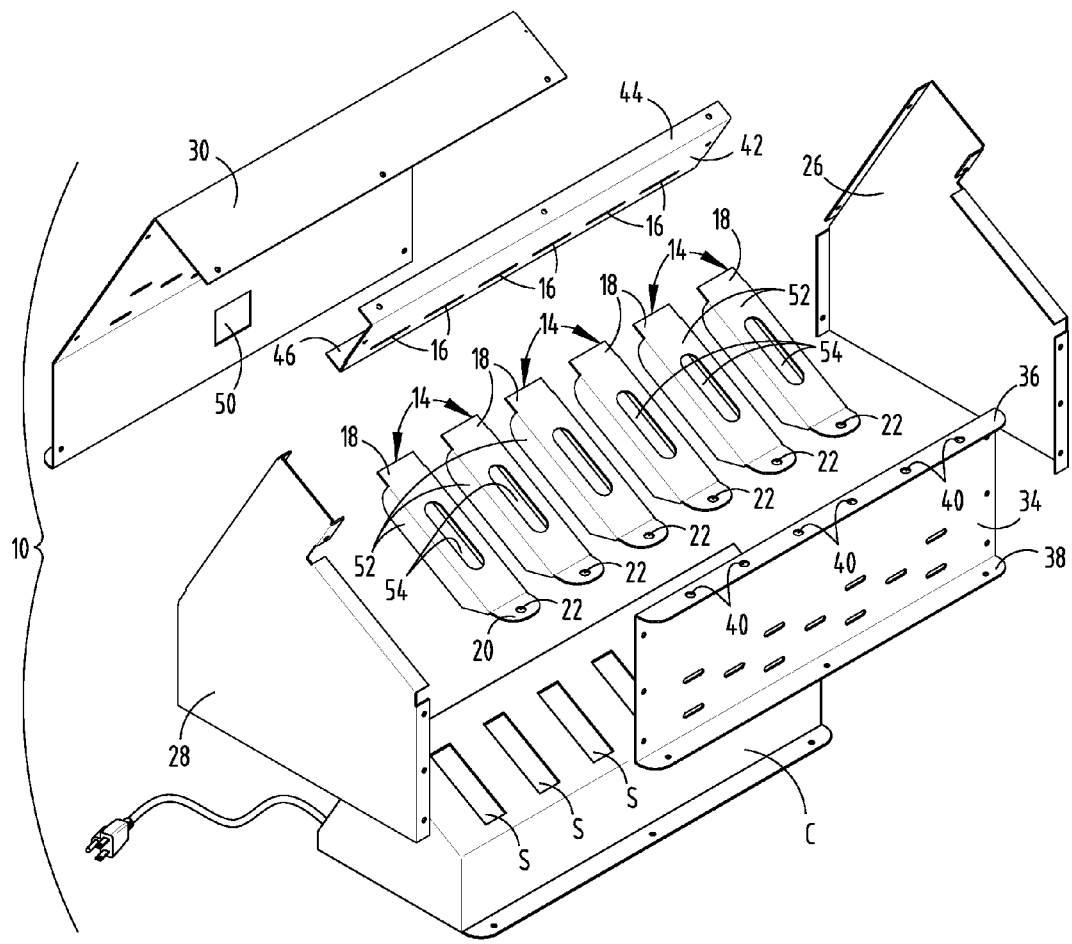
FIG. 4 is an exploded front perspective view of the first charging station cover assembly shown in FIG. 1.
Figure 5:
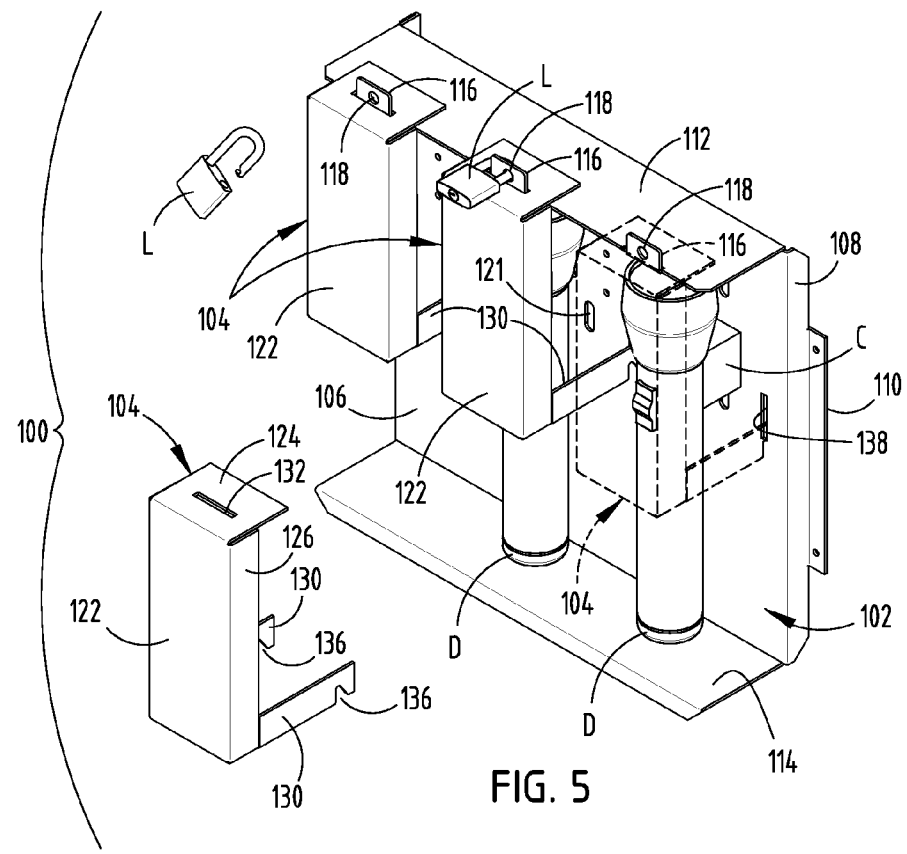
FIG. 5 is a front perspective view of a second charging station cover assembly.
Figure 6:
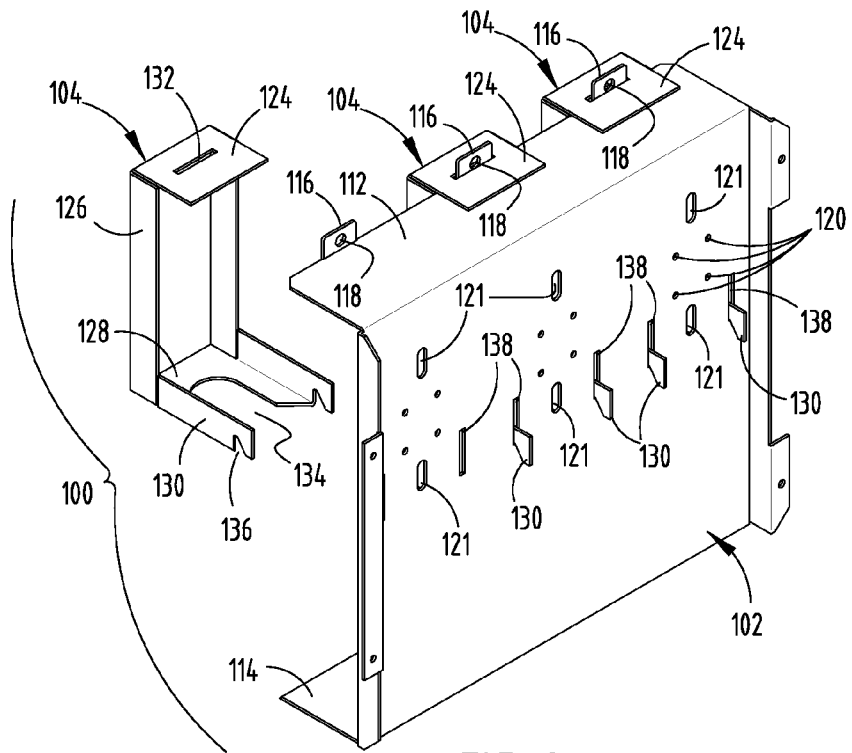
FIG. 6 is a rear perspective view of the second charging station cover assembly shown in FIG. 5.
Figure 7:
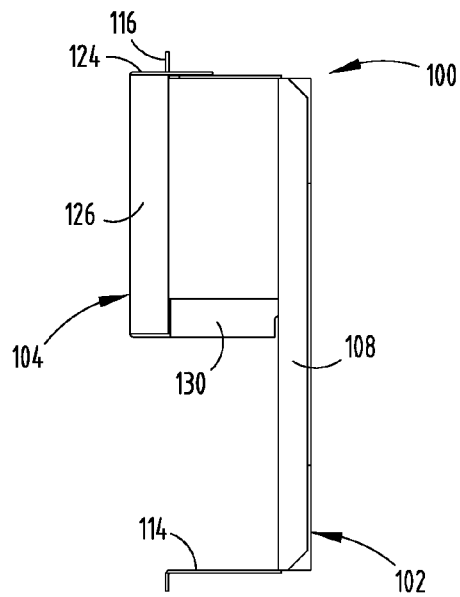
FIG. 7 is a side view of the second charging station cover assembly shown in FIG. 5.
Figure 8:
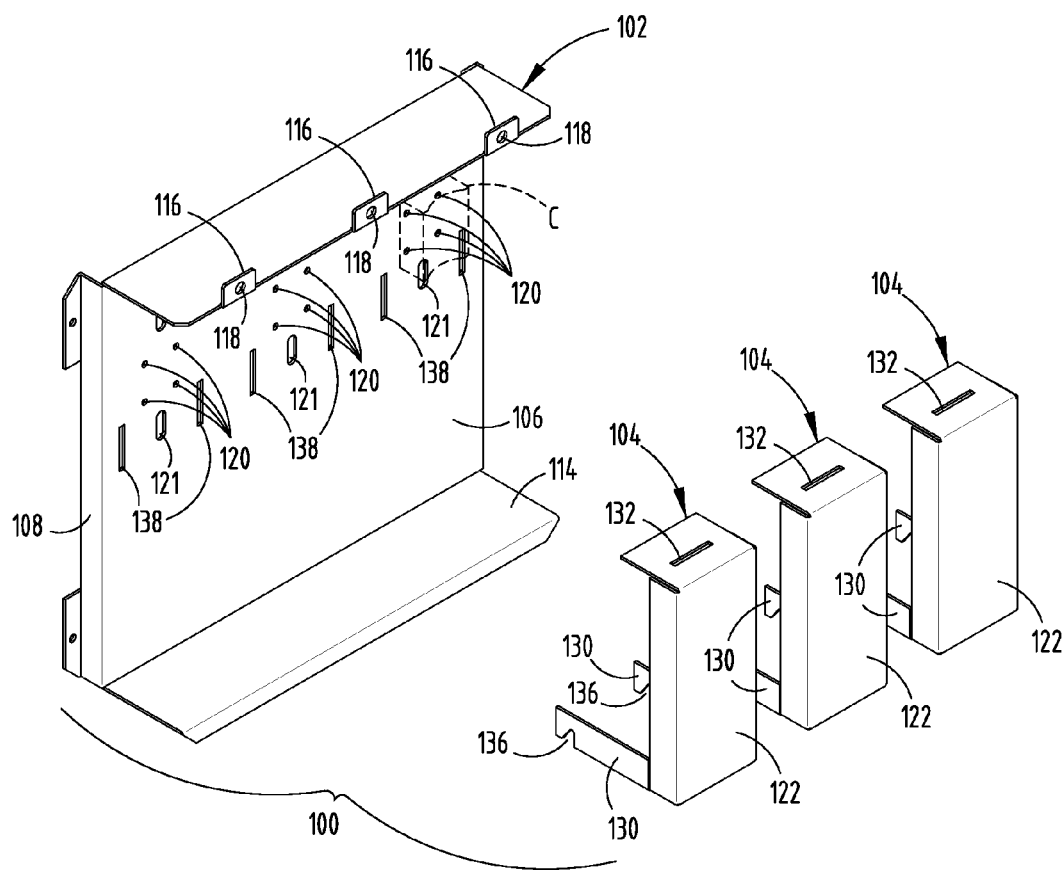
FIG. 8 is an exploded front perspective view of the second charging station cover assembly shown in FIG. 5.

As shown in FIGS. 1-4, base 12 may be composed of individual pieces 24, 26, 28, 30, 32. Construction using individual pieces may be preferable if a base 12 will be fabricated using a material such as sheet metal for durable, sturdy, inexpensive construction. If sheet metal or a similar material will be used, and individual pieces will be cut, these pieces can be provided with tabs along the edges, which can be bent to form flanges for assembly, as shown in FIG. 4. Alternatively, base 12 may be formed from other sturdy, rigid materials, such as plastic materials, where forming base 12 as a single piece may be preferable.

Individual locking covers 14 are preferable for each rechargeable device D, so that each device D may be assigned to an individual user, with the individual user having access to a code or key to unlock locking cover 14 from base 12 and access device D.

In use, chanting station C is placed inside base 12, with its power cord extending through opening 50, and docking stations S for each electric device D facing upwards and accessible between lower front channel 24 and upper front channel 32. Slots 16 in upper front channel 32 and holes 40 in locking flange 36 are positioned so as to allow each locking cover 14 to secure one rechargeable electric device D when it is in position over the docking station S in charging station C.

Lockably securing a rechargeable electric device D in position when it is electrically connected to docking station S can ensure that the rechargeable electric device D is fully charged when it is needed. A locking cover 14 which permits each rechargeable electric device D to be individually locked in position on a charging station C permits each user to ensure that his or her own equipment is fully recharged and ready for use when needed. This may be useful in various situations such as where rechargeable electronic devices D are used in a multi-shift work environment or where there are multiple users throughout the day or night who may use the rechargeable electric device D.

In another preferred embodiment, a lockable cover assembly 100 for a rechargeable electric device D comprises a wall base 102 and a plurality of locking covers 104, with one locking cover 104 for each rechargeable electric device D. (FIGS. 5-8).

Wall base 102 comprises a generally flat body 106, which is preferably wider than a wall outlet cover over which it will be placed. (FIGS. 5-6) Each side of body 106 has a flange 108 extending back toward the wall therefrom, and then one or more tabs 110 bending perpendicularly out to the side, with holes 111 therethough to permit fastening of wall base 102 above an electrical outlet. Tabs 110 are preferably oriented on the right and left side of wall base 102 so as to have two tabs 110 extending from one side, and one tab extending from the other, such that two lockable cover assemblies 100 can be installed next to each other, with tabs 110 interlocking, so that holes 111 therethrough are vertically aligned and so that multiple wall bases 102 can be oriented next to each other with each one fastened into wall studs. To further facilitate the ability to fasten wall bases 102 securely to the wall, wall base 102 can be designed with a 16" width between holes 111, so as to permit fastening into standard-width studs on each side of wall base 102.

Body 106 also has a forwardly directed flange 112 along its top edge, and a forwardly directed flange 114 along its bottom edge, with forwardly directed flanges 112, 114 spaced to permit the electrical device D to fit between them. Top flange 112 has a tab 116 extending perpendicularly therefrom, away from body 106 to correspond with each locking cover 104. Each tab 116 has a hole 118 therethrough to accommodate passage of a lock L.

Body 106 has openings 120 therethrough for mounting individual charging bases C for each of the rechargeable electric devices D. (FIG. 6) Body 106 also has openings 121 therethrough to permit passage of cords from the individual charging bases C, so that they can run behind body 106 to by plugged into an electrical receptacle.

Locking covers 104 comprise a front body 122, a top flange 124, side flanges 126, a bottom flange 128, and two rearwardly extending arms 130. Each top flange 124 has a slit 132 therethrough, to permit passage of tab 118 therethrough. Each bottom flange 128 has an opening 134 to accommodate the size and shape of the electrical device D to be charged, and arms 130 extending back towards the wall base 102, having notches 136 near the distal end thereof.

Body 106 has two slots 138 therein for each locking cover 104, with one slot 138 fir each arm 130. Each Notch 136 rests on the edge of slot 138, keeping locking cover 104 at the desired orientation and angle from wall base 102.

The second embodiment of locking cover assembly 100 is preferably used with electrical devices D having individual charging bases C, such as certain rechargeable flashlights that are currently available. Second embodiment 100 is also preferably sized to fit the desired electrical devices D to be charged, so that bottom flange 128 provides support for electrical devices D when they are present at the locking cover assembly 100.

To use this second embodiment, individual charging bases C are mounted on wall base 102, and wall base 102 is attached to the wall, preferably above an electrical outlet. Then, rechargeable electric device D is plugged into an individual charging base C, and locking cover 104 is placed over tab 116 of wall base 102, and then arms 130 are aligned with and extended through sots 138 in wall base 102. A lock L is then threaded through hole 118 in tab 116 to retain locking cover 104 on wall base 102.

Individual locking covers 14, 104 may also be hingedly attached to base 12 or wall base 102, respectively, so as to pivot from an open position, where electrical device D can be removed from the charging base C, to a closed position, where electrical device D is secured to charging base C.

Of course it is understood that the above is a description of preferred embodiments, and that various changes and alterations can be made to the charging stations without departing from the spirit and broader aspects of the invention.

What is claimed is:

1. A lockable charging station for charging rechargeable electric devices comprising:
    A base which at least partially surrounds an electrical charging unit; and
    A plurality of locking cover members; wherein each locking cover member is removably mechanically engageable with the base, is individually lockable to the base using a lock; and, when mechanically engaged with the base, is capable of at least partially encasing one electric device which is electrically engaged with the electrical charging unit for recharging.

2. The charging station of claim 1, wherein each locking cover member is removably mechanically engageable with the base via tab and slot engagement.

3. The charging station of claim 1, wherein the electrical charging unit comprises an individual-unit charger.

4. A lockable charging station for charging rechargeable electric devices comprising:
    a base which at least partially surrounds an electrical charging unit;
    a plurality of locking cover members;
    wherein each locking cover member is removably mechanically engageable with the base, and is individually lockable to the base using a lock;
    when mechanically engaged with the base, each locking cover member is capable of at least partially encasing one electric device which is electrically engaged with the electrical charging unit for recharging;
    each electrical charging unit comprises a multi-unit charger, and the base comprises:
        a lower front channel, having a flange along its upper edge;
        an upper front channel which is positioned laterally from the lower front channel, permitting passage of the electrical device between the lower front channel and upper front channel, the upper front channel having slots therein to accept the locking cover members;
        a rear panel, having an opening therein for passage of an electrical power cord extending from the multi-unit charger; and
        two end members, one connected at each end of the lower front channel, the upper front channel and the rear panel, and rigidly holding the lower front channel, upper front channel and rear panel in place.

5. The charging station of claim 4, wherein the lower front channel has a plurality of first lock holes therein to correspond with the positions of each electric device that is accommodated by the multi-unit charger, and wherein each locking cover member has a corresponding second lock hole therein which is aligned over the first lock hole when the locking cover is engaged with the slot provided therefor in the upper front channel.

6. The charging station of claim 5, wherein the locking cover member fits over the lateral space between the lower front channel and upper front channel to enclose the electric device when it is positioned on the multi-unit charger, preventing removal of the electric device from the charger.

7. The charging station of claim 6, wherein the lower edge of the lower front channel and the lower edge of the rear panel each have a flange extending outwardly therefrom, said flanges providing surface area for connection of said base to a supporting surface.

8. The charging station of claim 7, wherein the flanges have holes therethrough to permit passage of a fastening device through the flange and into the supporting surface.

9. The charging station of claim 6, wherein the base and locking cover members are adapted to be used with a multi-unit charger for two-way radios.

10. The charging station of claim 6, wherein the base and the locking cover members are manufactured using sheet metal.

11. A lockable charging station for charging rechargeable electric devices comprising:
   a base which at least partially surrounds an electrical charging unit;
   a plurality of locking cover members;
   wherein each locking cover member is removably mechanically engageable with the base, and is individually lockable to the base using a lock;
   when mechanically engaged with the base, each locking cover member is capable of at least partially encasing one electric device which is electrically engaged with the electrical charging unit for recharging;
   each locking cover member is removably mechanically engageable with the base via a tab and slot engagement;
   the electrical charging unit comprises an individual unit charger;
   the base comprises a wall base having holes therein to permit fastening of the individual unit charger to the wall base;
   the wall base also having flanges extending back from at least two sides of the main body, and having at least one tab extending outwardly from each flange; and
   said tabs provide a surface area for the connection of said wall base to a supporting surface.

12. The charging station of claim 11, wherein the tabs for connecting the wall base to a supporting surface have holes therethrough to permit passage of a fastener.

13. The charging station of claim 12, wherein the wall base is arranged so that the holes through the tabs are spaced at approximately 16 inches apart, to allow fasteners extending through the holes to fit standard stud spacing.

14. The charging station of claim 11, further comprising:
   A forwardly directed flange along one edge of the wall base;
   Each locking cover member comprising a front cover, with a top, two side flanges and a pair of arms extending rearwardly therefrom, the top being adapted to engage with the forwardly directed flange of the wall base; and
   A plurality of slots in the main body of the wall base adapted to receive the arms of the locking cover.

15. The charging station of claim 14, wherein the engagement between the forwardly directed flange of the wall base and the top comprises a tab extending upwardly from the forwardly directed flange, and a corresponding slit in the top of the locking cover member to fit over said tab.

16. The charging station of claim 15, wherein a hole is provided in the tab to permit passage of a padlock, such that the cover member is lockably engageable with the base, preventing removal of the electric device from the electrical receptacle when the cover member is locked to the base.

17. The charging station of claim 16, wherein the base and locking cover members are manufactured using sheet metal.

18. The charging station of claim 16, wherein the base and locking cover members are adapted to be used with flashlights having rechargeable electric batteries.

* * * * *